US011958024B2

(12) United States Patent
Quenstedt

(10) Patent No.: US 11,958,024 B2
(45) Date of Patent: Apr. 16, 2024

(54) FLARES FOR MIXING AND BURNING MULTIPLE GASSES

(71) Applicant: Pruitt Production Services, Inc., Giddings, TX (US)

(72) Inventor: Scott Quenstedt, San Antonio, TX (US)

(73) Assignee: Pruitt Production Services, Inc., Giddings, TX (US)

( * ) Notice: Subject to any disclaimer, the term of this patent is extended or adjusted under 35 U.S.C. 154(b) by 554 days.

(21) Appl. No.: 17/071,591

(22) Filed: Oct. 15, 2020

(65) Prior Publication Data

US 2022/0118412 A1 Apr. 21, 2022

(51) Int. Cl.
*B01F 25/314* (2022.01)
*B01F 25/313* (2022.01)
*F23G 7/08* (2006.01)

(52) U.S. Cl.
CPC ........ *B01F 25/3142* (2022.01); *B01F 25/313* (2022.01); *F23G 7/08* (2013.01); *F23G 7/085* (2013.01); *F23D 2213/00* (2013.01); *F23G 2209/14* (2013.01)

(58) Field of Classification Search
CPC ........ F23G 7/08; F23G 7/085; F23G 2209/14; B01F 25/3142; B01F 25/313; B01F 25/31322; B01F 25/31324; B01F 25/3131; B01F 25/31332; F23D 2213/00; F23D 2900/14642
USPC .................................... 431/187, 181, 5, 202
See application file for complete search history.

(56) References Cited

U.S. PATENT DOCUMENTS

| | | | | |
|---|---|---|---|---|
| 6,792,726 | B1 * | 9/2004 | Price | F16L 5/04 52/220.8 |
| 6,862,888 | B2 * | 3/2005 | Akagi | F23R 3/36 60/39.463 |
| 7,143,583 | B2 * | 12/2006 | Hayashi | F23R 3/18 60/737 |
| 7,967,600 | B2 | 6/2011 | Hong et al. | |
| 10,584,873 | B1 * | 3/2020 | Bacon | F23G 7/085 |
| 2010/0291492 | A1 | 11/2010 | Poe et al. | |

* cited by examiner

*Primary Examiner* — Vivek K Shirsat
(74) *Attorney, Agent, or Firm* — WEISBERG I.P. LAW, P.A.

(57) ABSTRACT

Gas flares configured to mix and burn multiple gasses are disclosed. According to one aspect, a gas flare head includes a first and second conduit one inside the other to form an interior region between the conduits. The interior region between the conduits is partitioned into multiple channels by a dividing structure. Each channel is configured to route a gas from a source to a mixing chamber where the gasses are mixed and burned.

11 Claims, 8 Drawing Sheets

FLARES FOR MIXING AND BURNING MULTIPLE GASSES

FIELD

The present technology is generally related to gas flares, and in particular to gas flares configured to mix and burn multiple gasses.

BACKGROUND

Gas flares are used in a variety of applications to burn combustible gasses arising naturally or created by man-made processes. For example, at a petroleum oil field site, a tank of crude oil gives rise to a low pressure gas that cannot be vented into the atmosphere. Instead, the low pressure gas is burned in a gas flare. Also, high pressure gas may be generated at the site to separate water from hydrocarbons. This high pressure gas cannot be vented into the atmosphere either and may instead be burned in a gas flare. Gas flares are also used in industrial plants, for example, to burn off gas released from safety valves.

A gas flare has a gas flare head that is usually positioned at a top of a large stack or pipe. The gas flare head receives and mixes one or more gasses and a mixing fluid in a mixing chamber where the gases are ignited. Referring now to the drawing figures, where like reference numerals indicate like parts, there is shown in FIG. 1 a side view and partial top view of a conventional gas flare head 10 of a gas flare. Note that the drawings are not to scale and the proportions and sizes of the various parts relative to one another may be smaller or larger than shown in the drawings. The gas flare head 10 includes two concentric pipes: an inner pipe 12 and an outer pipe 14. The inner pipe 12 has an inlet 16 and an open end 18. The inlet 16 receives a fluid such as steam or air that may come from an air blower or from a steam injector, for example. The inner pipe 12 routes the received fluid to the open end 18 and into a mixing chamber 20. The two concentric pipes 12 and 14 form an annular ring 22 that encircles the inner pipe 12. The annular ring 22 routes a combustible gas received from a plenum 24 to the mixing chamber 20. The plenum 24 encircles the outer pipe 14. The plenum 24 receives the combustible gas from a combustible gas source through an inlet 26. The combustible gas is routed to the mixing chamber 20 through the annular ring 22. An igniter, not shown, ignites the mixture of combustible gas and fluid in the mixing chamber 20. In the example of FIG. 1, the mixing chamber 20 may be identified as the region above the open end 18 of the inner pipe 12 and below the open end 28 of the outer pipe 14. A disadvantage of the gas flare head 10 of FIG. 1 is that it only routes one gas to the mixing chamber 20. Gasses from different sources must be routed to different gas flare heads 10.

FIG. 2 shows an alternative gas flare head 30 for combining two combustible gasses and a fluid in a mixing chamber 32. The gas flare head 30 includes three concentric pipes: an innermost pipe 34, an outermost pipe 36 and an intermediate pipe 38 between the innermost pipe 34 and the outermost pipe 36. A first annular ring 40 exists between the innermost pipe 34 and the intermediate pipe 38. A second annular ring 42 exists between the intermediate pipe 38 and the outermost pipe 36. In the gas flare head 30, the innermost pipe 34 has an inlet 44 and a first open end 46 that opens into the mixing chamber 32. The intermediate pipe 38 also opens into the mixing chamber 32. A first gas line 48 routes a first gas to the first annular ring 40 and a second gas line 50 routes a second gas to the second annular ring 42. The gas in each annular ring 40 and 42 enters the mixing chamber 32 where they are mixed with the fluid entering the mixing chamber 32. An igniter, not shown, ignites the mixture in the mixing chamber 32. Note that the distance L1 from the nearest inlet receiving gas to the open end 28 of the outermost pipe 36 may be any suitable distance. A disadvantage of the gas flare head 30 of FIG. 2 is the complexity of its construction.

SUMMARY

The techniques of this disclosure generally relate to gas flares, and in particular to gas flares configured to mix and burn multiple gasses.

According to one aspect, a gas flare head configured to mix and burn multiple gasses is provided. The gas flare head includes a first conduit having a wall and a first conduit open end and a second conduit disposed at least partially within the first conduit to form an interior region. The second conduit has a second conduit open end recessed within the first conduit so that the wall and the first conduit open end extend beyond the second conduit open end to form a mixing chamber between the first conduit open end and the second conduit open end, an interior of the second conduit being configured to channel a mixing fluid to the mixing chamber through the second conduit open end. The gas flare head also includes at least one divider positioned in the interior region between the first and second conduits to divide the interior region into at least a first channel and a second channel, the first channel being configured to route a first gas to the mixing chamber and the second channel being configured to route a second gas to the mixing chamber.

According to this aspect, in some embodiments, the first conduit and the second conduit are disposed at least in part as concentric pipes. In some embodiments, the at least one divider divides the interior region into angular sectors. In some embodiments, the at least one divider is configured to withstand a highest pressure of the first and second gasses. In some embodiments, the at least one divider divides the interior region into more than two channels, each channel being configured to separately route a gas to the mixing chamber. In some embodiments, the second conduit is configured to route a liquid to the mixing chamber. In some embodiments, the wall of the first conduit is configured with at least a first opening and a second opening, each of the first and second openings configured to receive a different gas. In some embodiments, a first gas line is coupled to the first conduit at the first opening and a second gas line is coupled to the first conduit at the second opening.

According to another aspect, a method of manufacture of a gas flare head is provided. The method includes positioning a dividing structure on a first length of a first pipe, the dividing structure having at least two fins adjoined to a base at one end of the fins, the base configured to surround the first pipe, the dividing structure being positioned on the first length of the first pipe so that each fin extends from the base to a point in proximity to an open end of the first pipe. The method also includes positioning a second pipe over at least a part of the first pipe and over at least the fins of the dividing structure to form at least two channels, each channel bounded by at least two fins, by the base, and by walls of the first and second pipes, the second pipe having a second length at least as long as a distance from the base to the open end of the first pipe.

According to this aspect, in some embodiments, the method further includes prior to positioning the second pipe, cutting at least two slots in the second pipe, each slot corresponding to a different fin and being at least as long as a corresponding fin. The method also includes binding each of the at least two fins to the second pipe along a corresponding slot. The method further includes sealing the second pipe to the base to prevent gas from escaping around the base. In some embodiments, the binding is by welding. In some embodiments, the binding is by a paste configured to harden over time. In some embodiments, the method further includes, prior to positioning the second pipe over at least the part of the first pipe, binding the dividing structure to the first pipe. In some embodiments, the method further includes, prior to positioning the second pipe over at least the part of the first pipe, making at least two openings in the second pipe, each opening configured to receive a gas into a separate one of the at least two channels. In some embodiments, the method also includes positioning the second pipe so that an open end of the second pipe extends beyond the open end of the first pipe to form a mixing chamber to receive a gas from each of the at least two channels.

According to yet another aspect, a gas flare head is provided. The gas flare head includes an outer pipe and an inner pipe. The inner pipe is at least partially disposed within the outer pipe, the inner pipe having an inner pipe open end that is recessed within the outer pipe to form a mixing chamber that extends at least from the inner pipe open end to an outer pipe open end, the inner pipe configured to route a fluid to the mixing chamber. The gas flare head also includes a partitioning structure to partition a region between the inner pipe and the outer pipe into channels, each channel configured by the partitioning structure to route a gas from a different source to the mixing chamber.

According to this aspect, in some embodiments, the outer pipe is configured with an opening for each channel, each opening configured to receive a gas from a different source into a respective channel. In some embodiments, the partitioning structure has at least two fins having ends affixed to a base, the base configured to surround the inner pipe, the partitioning structure being positioned so that each of the at least two fins extends from the base to the inner pipe open end. In some embodiments, the at least two fins are compressible. In some embodiments, the inner pipe is configured to route a liquid to the mixing chamber.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Gas flares configured to mix and burn multiple gasses are disclosed. According to one aspect, a gas flare head includes a first and second conduit one inside the other to form an interior region between the conduits. The interior region between the conduits is partitioned into multiple channels by a dividing structure. Each channel is configured to route a gas from a source to a mixing chamber where the gasses are mixed and burned.

Figure 1:
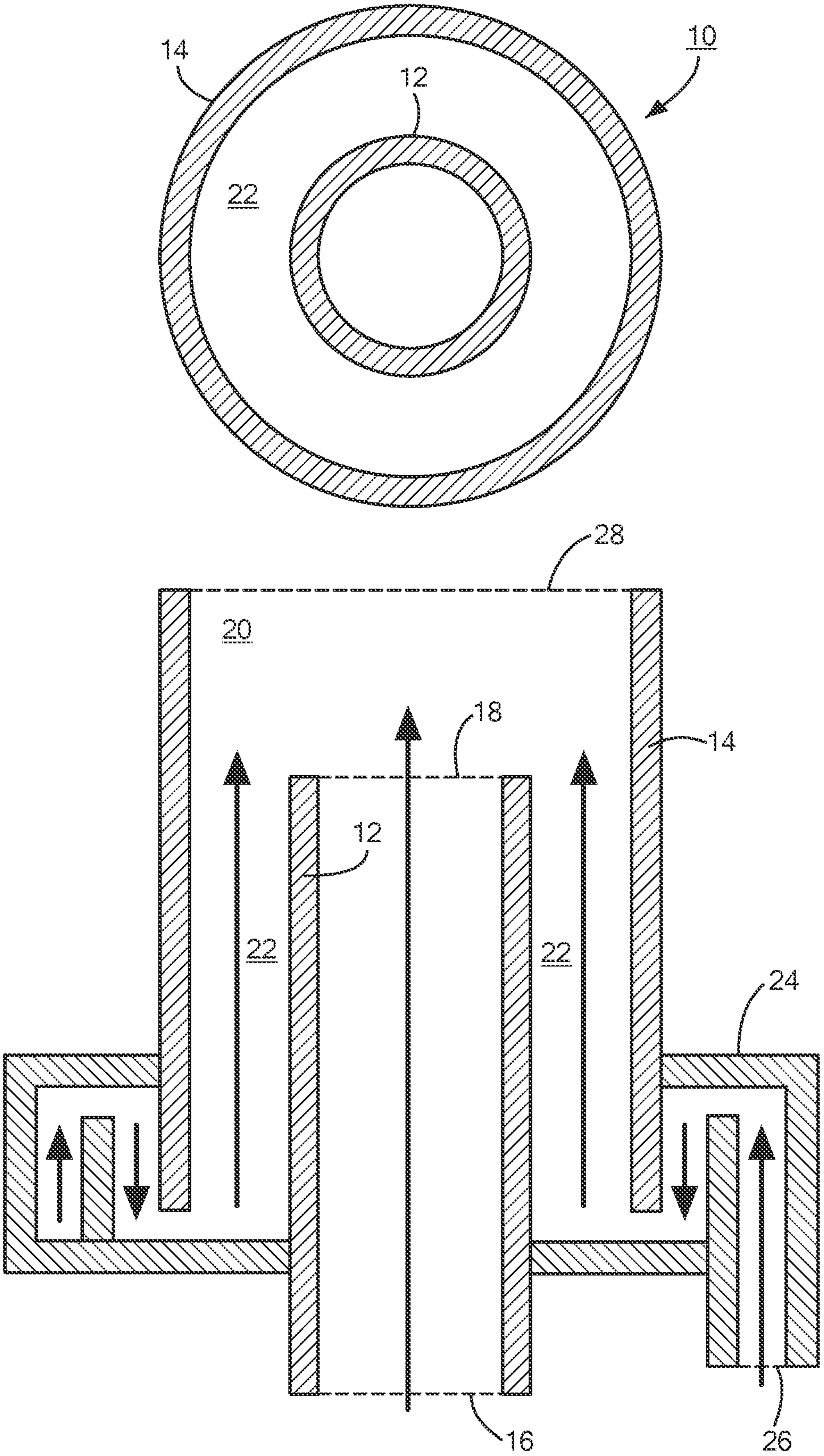
FIG. 1 is a first conventional gas flare head.
Figure 2:
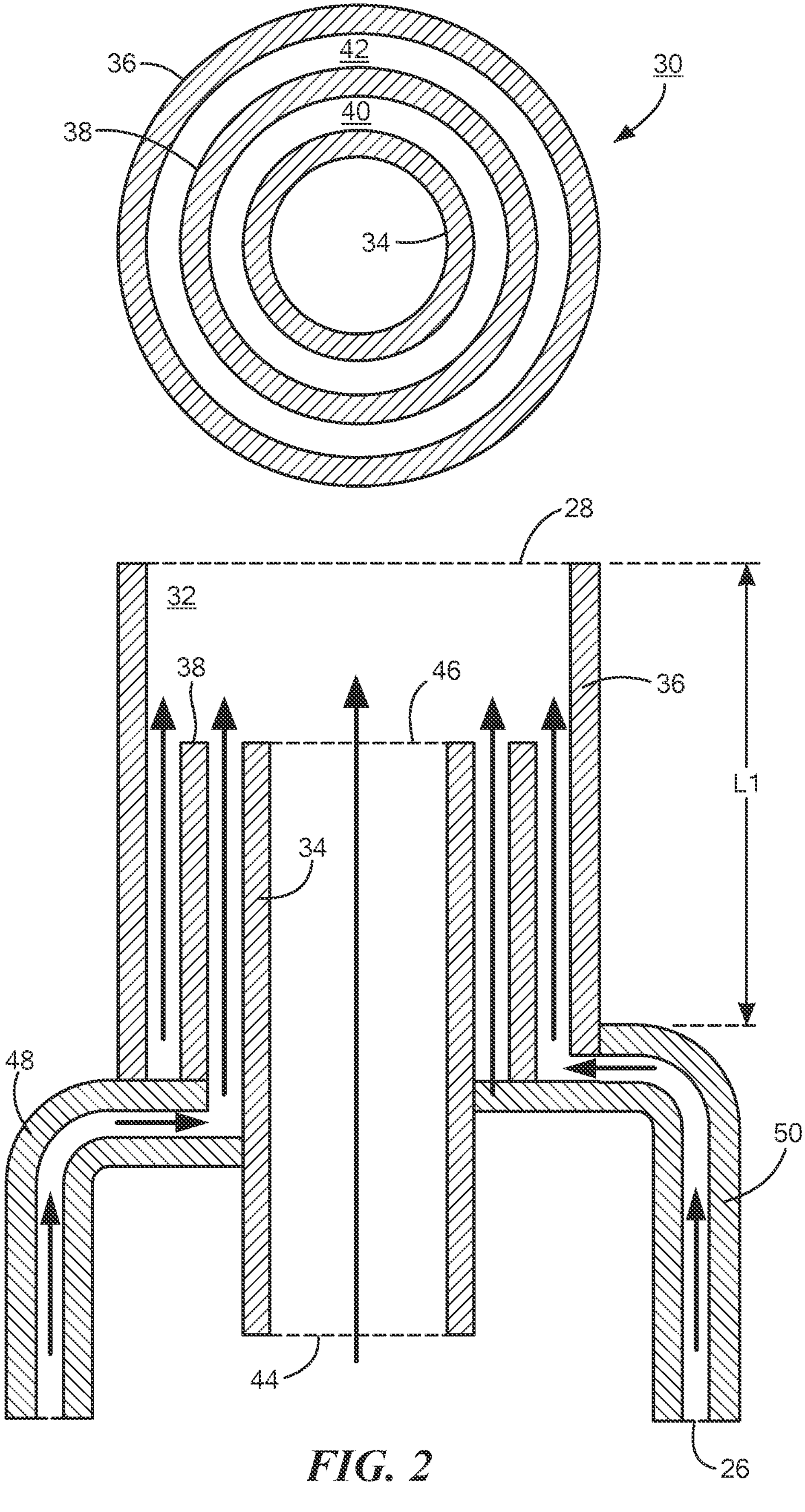
FIG. 2 is a second conventional gas flare head.
Figure 3:
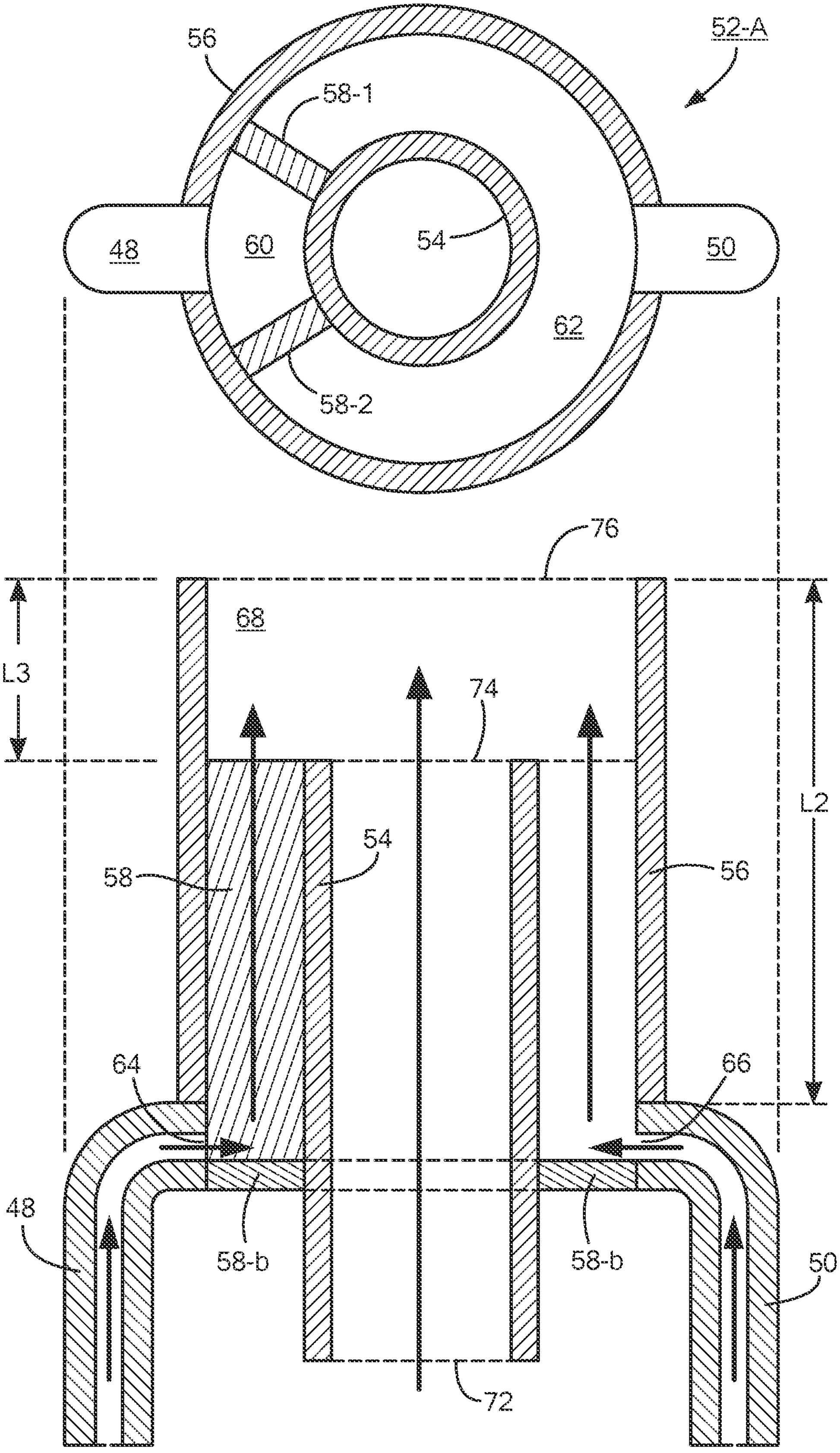
FIG. 3 is a first example embodiment of a gas flare head constructed in accordance with principles disclosed herein.

Referring again to the drawing figures, there are shown in FIGS. 3-6 various embodiments of multi-channel gas flare heads, referred herein collectively as gas flare heads 52, that are constructed according to principles disclosed herein. FIG. 3 depicts one example embodiment of a multi-channel gas flare head 52-A. The gas flare head 52-A has an inner pipe 54 and an outer pipe 56. A dividing structure 58 has divider walls 58-1 and 58-2 that partition the interior region between the inner pipe 54 and the outer pipe 56 into channels 60 and 62. Note that in some embodiments, the divider walls may be referred to as fins 58-1 and 58-2. In the example of FIG. 3, the interior region is divided into angular sectors. For example, one channel 60 may occupy an angular sector of 90 degrees and the other channel 62 may occupy an angular sector of 270 degrees. As will be explained further below, the divider walls 58-1 and 58-2 may be attached to a base 58-*b* which encircles the inner pipe 54 or is at least concentric with the inner pipe 54. The base 58-*b* may therefore be part of the dividing structure 58. In some embodiments, the dividing structure 58 is made of one continuous single piece of metal or plastic, for example. In some embodiments, the inner pipe 54 and the outer pipe 56 may be of dissimilar materials. For example, one of the two pipes may be aluminum and the other of the two pipes may be steel. Further, in some embodiments, the dividing structure 58 may include a compressible material such as a rubber or plastic compound that is compressed between the inner pipe 54 and the outer pipe 56 when the gas flare head 52 is assembled.

The channel 60 receives a first gas from the first gas line 48 through a first opening 64. Similarly, channel 62 receives a second gas from the second gas line 50 through a second opening 66. Each gas may be under a different pressure or the same pressure. The divider walls 58-1, 58-2 and base 58-*b* may be configured to withstand the highest pressure of either the first gas or the second gas. The channel 60 routes the first gas from the first gas line 48 to a mixing chamber 68. The channel 62 routes the second gas from the second gas line 50 to the mixing chamber 68. The inner pipe 54 routes a fluid such as air or steam, for example, from the inlet 72 of the inner pipe 54 to the mixing chamber 68 through the open end 74 of the inner pipe 54.

The fluid routed by the inner pipe 54 to the mixing chamber 68 may be pumped through the inner pipe 54 at a constant pressure or a controllable or non-controllable varying pressure. The fluid may serve one or more purposes that may include providing increased combustion efficiency by mixing the first and second gasses more efficiently, ensuring that the flow of burning gases remains directed toward the open end 76 of the outer pipe 56, and/or blowing the flame from the burning gasses out of the mixing chamber into the surrounding atmosphere. Other purposes may be served by the fluid routed to the mixing chamber 68 by the inner pipe 54. Varying degrees of mixing of the gasses and the fluid may be achieved by, for example, shaping the wall of the outer pipe 56 at or near the distal end of the outer pipe 56.

The first and second gasses are mixed and ignited in the mixing chamber 68. The burning gasses exit the mixing chamber through the open end 76 of the outer pipe 56, the burning gasses being accelerated in the direction of the open end 76 by the fluid routed to the mixing chamber 68 by the inner pipe 54. The source of the fluid may be an air blower or steam injector, for example. For convenience, the source is not shown. Persons having ordinary skill in the art will readily recognize different sources of fluid and how to route such sources to the inner pipe 54 of the gas flare head 52. Note that the distance L2 from the nearest inlet receiving gas to the open end 28 of the outermost pipe 36 may be any suitable distance or may be chosen to optimize performance for a particular application. Similarly, the chamber height L3 of the mixing chamber 68 may be chosen to optimize performance. For example, optimum performance may be an optimum efficiency of combustion of the received gasses. In some embodiments, the gas lines 48 and 50 and openings 64 and 66 may be located remote from the open end 74 of the inner pipe. For example, the gas lines may be joined to the channels 60 and 62 near the bottom of the stack, away from the open end 74 located near the top of the stack.

Figure 4:
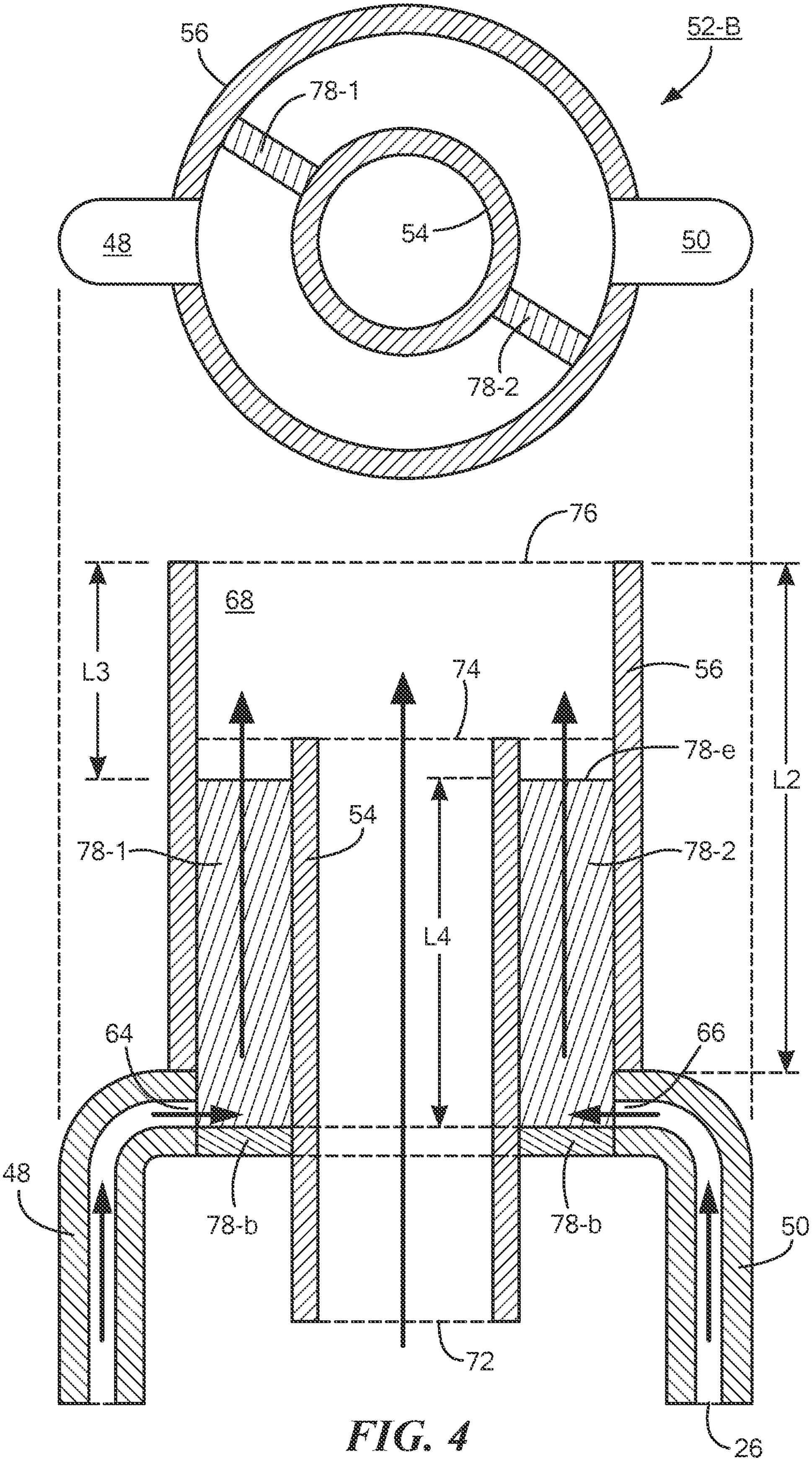
FIG. 4 is a second example embodiment of a gas flare head constructed in accordance with principles disclosed herein.

FIG. 4 shows another example embodiment of a gas flare head 52-B constructed according to principles disclosed herein. There are at least two differences between the gas flare heads 52-A and 52-B. Unlike the divider walls 58-1 and 58-2 of the gas flare head 52-A, the divider walls 78-1 and 78-2 of the gas flare head 52-B divide the region between the inner pipe 54 and the outer pipe 56 into two channels occupying equal angular sectors of 180 degrees. The dividing structure 78 includes the divider walls 78-1 and 78-2 and the base 78-*b*. Also, height L4 of a divider wall 78-1 and/or 78-2 may be such that the upper edge 78-*e* of the divider wall is below the height of the open end 74 of the inner pipe 54. This configuration may provide better mixing in the mixing chamber 68. In this embodiment, the chamber height L3 may be measured from the upper edge 78-*e* to the open end 76 of the outer pipe 56. In some embodiments, the height L4 of the divider walls 78-1 and 78-2 may be such that the upper edge 78-*e* of the divider wall is above the height of open end 74 of the inner pipe 54.

Figure 5:
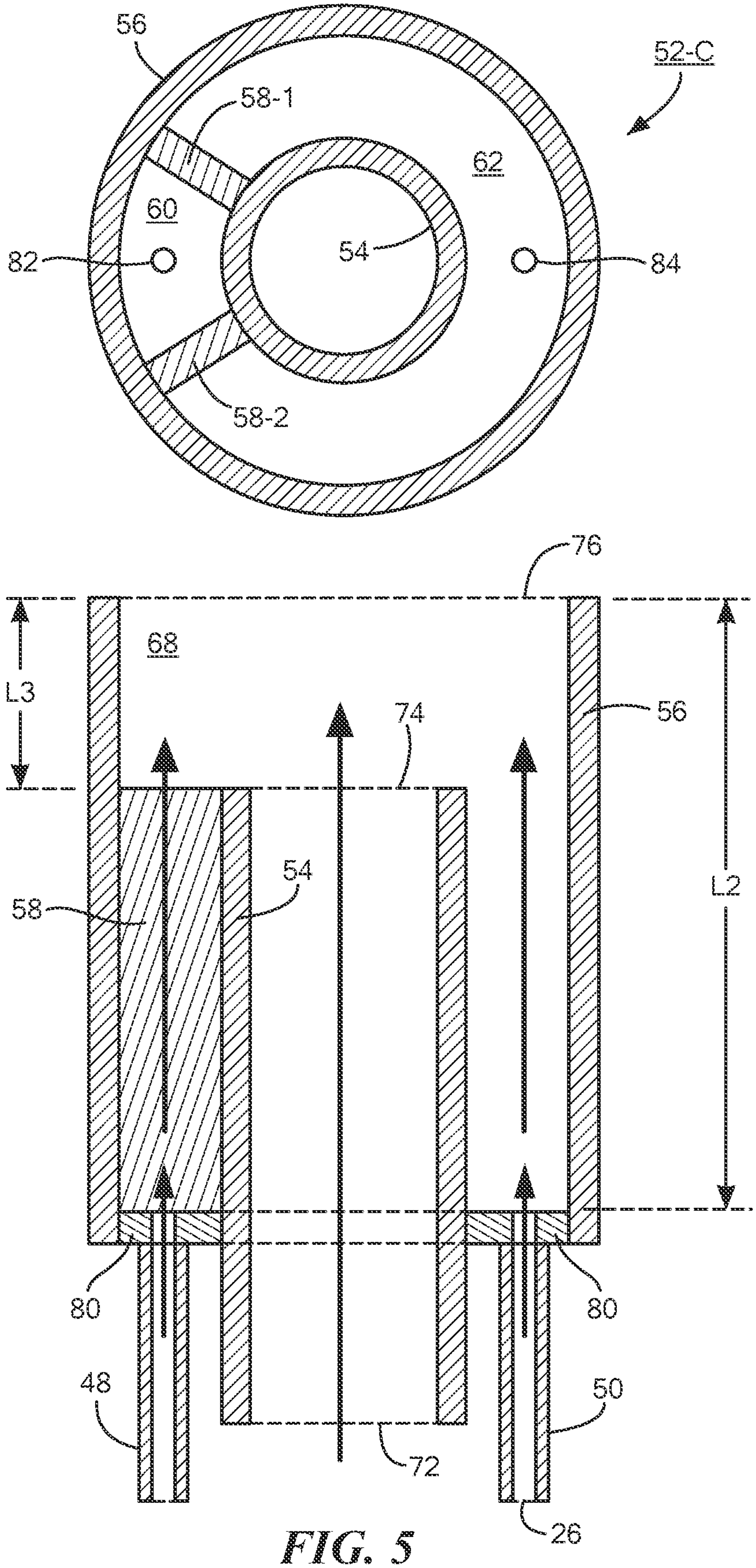
FIG. 5 is a third example embodiment of a gas flare head constructed in accordance with principles disclosed herein.

FIG. 5 shows another example embodiment of a gas flare head 52-C constructed according to principles disclosed herein. In the gas flare head 52-C, the gas lines 48 and 50 are connected at the base 80 of the dividing structure 58 between the divider walls 58-1 and 58-2. Thus, a first gas is routed by the gas line 48 into the channel 60 via a first opening 82 in the base 80 of the dividing structure 58. Similarly, a second gas is routed by the second gas line 50 into the channel 62 via a second opening 84 in the base 80 of the dividing structure 58. Note that the size of the openings 82 and 84

Figure 6:
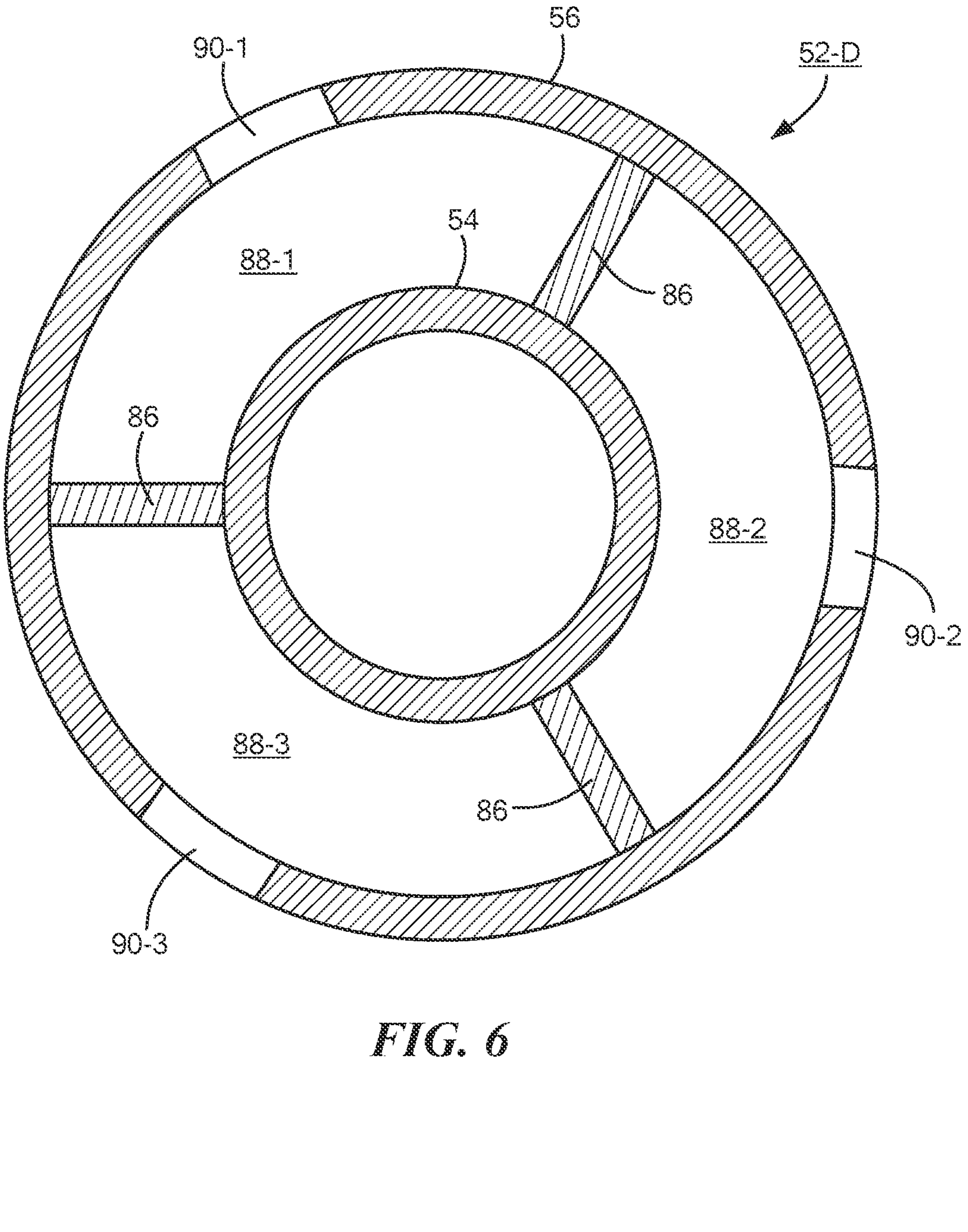
FIG. 6 is a fourth example embodiment of a gas flare head constructed in accordance with principles disclosed herein.

FIG. 6 shows a top view of another example gas flare head 52-D with a dividing structure 86 that divides the interior region into three channels 88-1, 88-2 and 88-3. Each channel occupies one of three angular sectors, in this example. Each channel 88-1, 88-2, 88-3 receives a gas from a different opening 90-1, 90-2, 90-3, respectively.

Note that a dividing structure can be configured to partition the interior region between the inner pipe 54 and the outer pipe 56 into more than three channels, in some embodiments. Note also that the openings 90-1, 90-2 and 90-3 can be the same size or can be different sizes. Further, the inner pipe 54 and the outer pipe 56 may be non-circular in cross section. For example, the inner pipe 54 and the outer pipe 56 may be elliptical or rectangular in cross section. In some embodiments, the inner pipe 54 is not concentric with the outer pipe 56.

Note that various parts of the gas flare heads 52-A through 52D can be pre-assembled and shipped to a site or plant where the gas flare is to be installed. For example, a pre-assembled subassembly may include the inner pipe 54, the outer pipe 56, and the dividing structure 58, 78. This subassembly may be shipped to a site where it is installed on a stack and connected to first and second gas lines 48 and 50, and possibly more gas lines. In some embodiments, for some gas flare applications, the subassembly is installed on a stack before shipping the combination of the subassembly and stack to the site where it is to be connected to gas lines 48 and 50, or even more than two gas lines, as discussed above.

Figure 7:
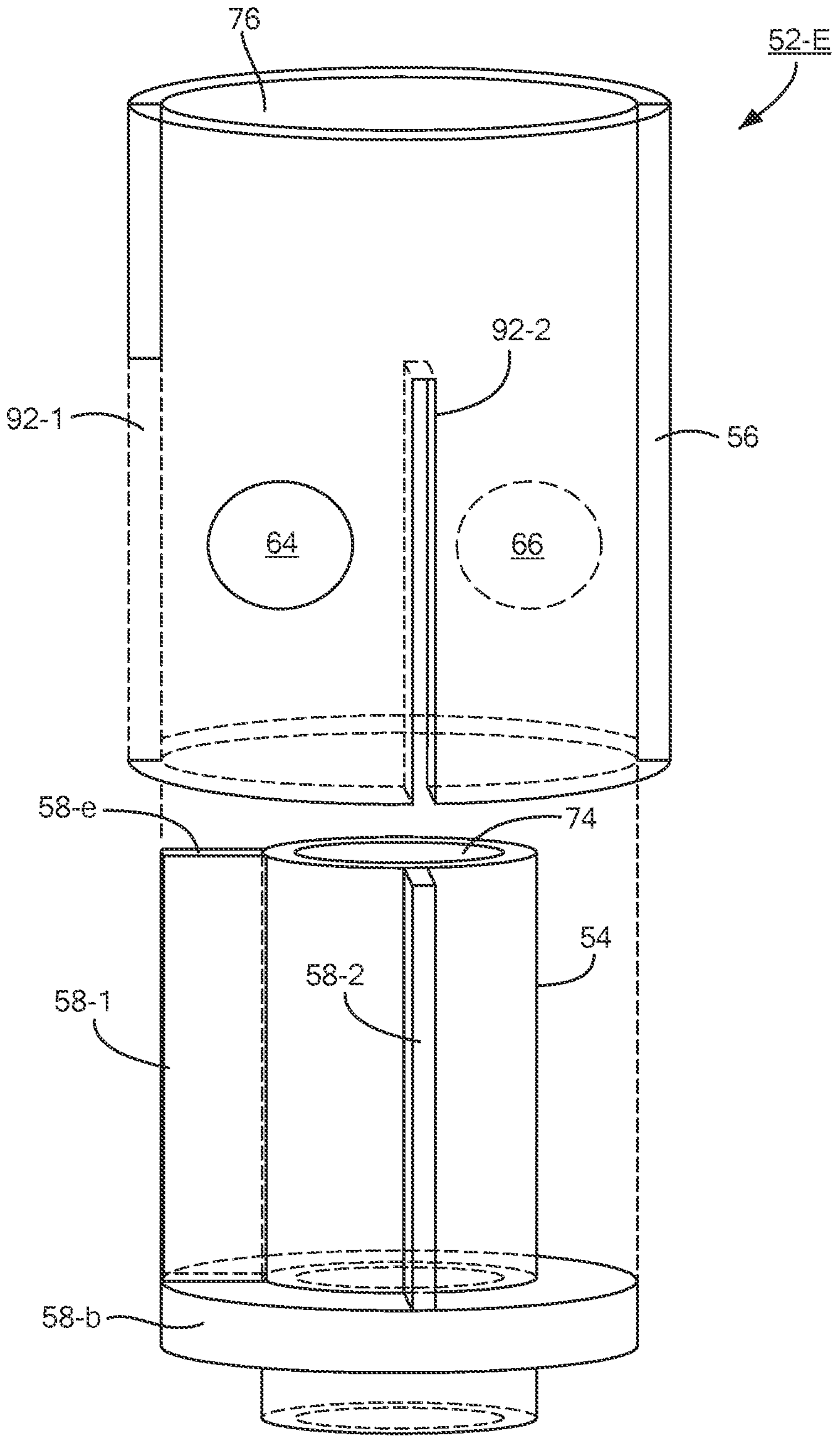
FIG. 7 illustrates a partially unassembled gas flare head according to principles disclosed herein.

FIG. 7 shows a partially unassembled gas flare head 52-E, which may be assembled to achieve the embodiments depicted in FIGS. 3, 4 and 6. Assembly of the gas flare head 52-E to achieve the embodiment depicted in FIG. 5, is similar and may differ only in where the gas lines 48 and 50 are coupled to the gas flare head 52. In one step of assembly of the gas flare head 52-E, the dividing structure 58, which includes the divider walls 58-1, 58-2 and the divider base 58-*b*, is preassembled by, for example, welding the divider walls 58-1 and 58-2 to the base 58-*b*. The dividing structure 58 may be constructed prior to sliding the dividing structure 58 over the inner pipe 54. The dividing structure 58 may be positioned over the inner pipe 54 so that the upper edge 58-*e* of a divider wall 58-1 is even with the open end 74 of the inner pipe 54. The dividing structure 58 may be bonded and/or placed in sealing engagement with the inner pipe 54 by, for example, welding and/or applying a binding/sealing paste along gaps where the dividing structure 58 meets the inner pipe 54.

Corresponding to each divider wall 58-1 and 58-1, there is a slot 92-1, 92-2 cut into the outer pipe 56. To assemble the gas flare head 52-E, the outer pipe 56 is oriented so that the slots 92-1 and 92-2 receive their respective divider walls 58-1, 58-2 as the outer pipe 56 is slid over the structure that includes the dividing structure 58 and the inner pipe 54. After the outer pipe 56 is positioned over the dividing structure 58 and the inner pipe 54, a sealing bead may be welded along the length of each slot 92-1 and 92-2 to seal the joint formed by a divider wall 58-1, 58-2 and the corresponding slot 92-1, 92-2, and to bind the divider wall 58-1, 58-2 to the outer pipe 56. As an alternative to welding a sealing bead, an adhesive paste configured to bond the divider wall 58-1, 58-2 to the outer pipe 56 may be applied along the slots 92-1 and 91-2, the adhesive paste being pliable when applied, yet hardening over time. In addition to bonding the divider walls 58-1 and 58-2 to the outer pipe 56 along the slots 92-1 and 92-2, the base 58-*b* of the dividing structure 58 may be bonded and sealed to the outer pipe 56 by welding or applying an adhesive paste, for example, to the joints formed between the base 58-*b* and the outer pipe 56. Once, the outer pipe 56 is placed in position over the inner pipe 54 and over the dividing structure 58, the gas lines 48 and 50 may be attached to the outer pipe 56 at openings 64 and 66.

In some embodiments, the divider walls 58-1 and/or 58-2 may be made of the same material as the inner pipe 54 and/or the outer pipe 56. In some embodiments, the divider walls 58-1 and/or 58-2 may be made of a compressible material that compresses against both the inner pipe 54 and the outer pipe 56 when the outer pipe 56 is slid over the subassembly comprising the dividing structure 58 and inner pipe 54.

Figure 8:
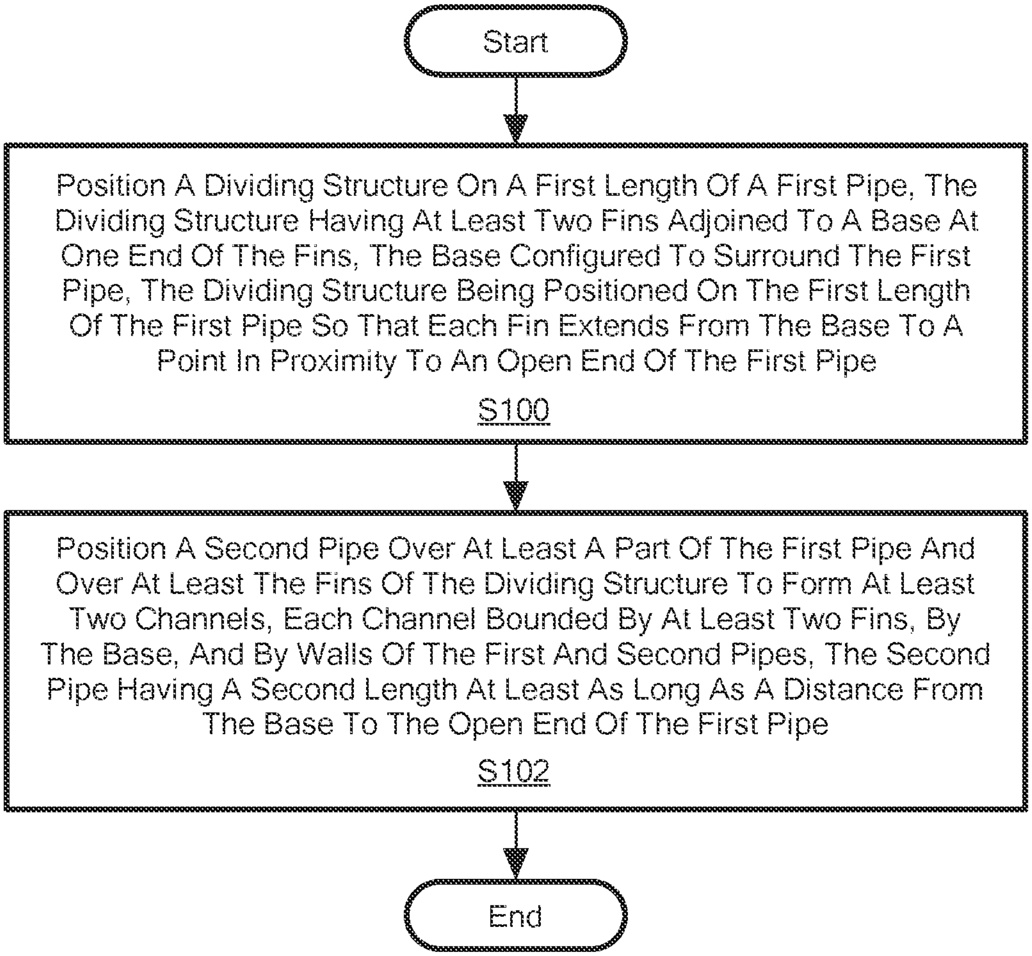
FIG. 8 is an example flowchart of an exemplary process of assembly of a gas flare head according to principles disclosed herein.

FIG. 8 is a flowchart of an example process of assembly of a gas flare head according to principles disclosed herein. The process includes positioning a dividing structure on a first length of a first pipe, the dividing structure having at least two fins adjoined to a base at one end of the fins, the base configured to surround the first pipe, the dividing structure being positioned on the first length of the first pipe so that each fin extends from the base to a point in proximity to an open end of the first pipe (Block S100). The process also includes positioning a second pipe over at least a part of the first pipe and over at least the fins of the dividing structure to form at least two channels, each channel bounded by at least two fins, by the base, and by walls of the first and second pipes, the second pipe having a second length at least as long as a distance from the base to the open end of the first pipe (Block S102).

Thus, some embodiments include gas flares and gas flare heads 52 configured to route gasses from multiple sources to a mixing chamber 68 for mixing and burning of the multiple gasses. In some embodiments, a gas flare head 52 includes an inner pipe or conduit 54 and an outer pipe or conduit 56 oriented to form an inner region in between the inner pipe or conduit 54 and the outer pipe or conduit 56. In some embodiments, the inner region is partitioned into channels 60, 62, 88, by a dividing structure 58, 78, 86, and the channels are configured to route the multiple gasses to the mixing chamber 68. Note that certain conventional components, such as conduit coupling devices to couple the gas lines 48 and 50 to the gas flare head 52, are not shown in the figures for simplicity.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A gas flare head, comprising:

an annular base forming a central fluid inlet extending through the base, a first gas inlet extending through the base and a second gas inlet extending through the base, the first and second gas inlets being positioned on opposite sides of the central fluid inlet;

a first conduit having a first wall and a first conduit open end, the first wall separating an exterior of the gas flare head from an interior of the gas flare head, the first conduit extending perpendicularly from the annular base to a first height and encompassing the central fluid inlet, the first gas inlet and the second gas inlet being exterior to the first conduit; and a second conduit having a second wall and a second conduit open end, the second conduit being disposed at least partially within the first conduit to form a first interior region interior to the first conduit and exterior to the second conduit and to form a second interior region interior to the second conduit, the second conduit extending perpendicularly from the annular base to a second height lower than the first height and encompassing the first and second gas inlets in the first interior region to form a mixing chamber between the first conduit open end and the second conduit open end, the second interior region being configured to channel a mixing fluid to the mixing chamber through the second conduit open end; and at least one divider positioned in the first interior region and extending from the first wall of the first conduit to the second wall of the second conduit to divide the first interior region into at least a first channel and a second channel, the first channel being configured to receive a first gas via the first gas inlet and to route the first gas to the mixing chamber and the second channel being configured to receive a second gas via the second inlet and to route the second gas to the mixing chamber.

2. The gas flare head of claim 1, wherein the first conduit and the second conduit are disposed at least in part as concentric pipes.

3. The gas flare head of claim 2, wherein the at least one divider divides the interior region into angular sectors.

4. The gas flare head of claim 1, wherein the at least one divider is configured to withstand a highest pressure of the first and second gasses.

5. The gas flare head of claim 1, wherein the at least one divider divides the interior region into more than two channels, each channel being configured to separately route a gas to the mixing chamber.

6. The gas flare head of claim 1, wherein the second conduit is configured to route a liquid to the mixing chamber.

7. The gas flare head of claim 1, further comprising a first gas line coupled to the first conduit at the first gas inlet and a second gas line is coupled to the first conduit at the second gas inlet.

8. A gas flare head, comprising:

an annular base forming a central fluid inlet extending through the base, a first gas inlet extending through the base and a second gas inlet extending through the base, the first and second gas inlets being positioned on opposite sides of the central fluid inlet;

an outer pipe having a first wall and an outer pipe open end, the first wall separating an exterior of the gas flare head from an interior of the gas flare head, the outer pipe extending perpendicularly from the annular base to a first height and encompassing the central fluid inlet, the first gas inlet and the second gas inlet being exterior to the first conduit;

an inner pipe having a second wall and a second conduit open end, the second conduit being at least partially disposed within the outer pipe, the second conduit extending perpendicularly from the annular base to a second height lower than the first height to form a mixing chamber and encompassing the first and second gas inlets in the first interior region, the inner pipe encompassing the first and second gas inlets in the first interior region; and a partitioning structure extending from a second wall of the inner pipe to the first wall of the outer pipe to partition a region between the inner pipe and the outer pipe into channels, a first channel being configured to route a first gas from the first inlet to the mixing chamber and a second channel being configured to route a second gas from the second inlet to the mixing chambers.

9. The gas flare head of claim 8, wherein the partitioning structure has at least two fins having ends affixed to the annular base, the annular base configured to surround the inner pipe, the partitioning structure being positioned so that each of the at least two fins extends from the annular base to the inner pipe open end.

10. The gas flare head of claim 9, wherein the at least two fins are compressible.

11. The gas flare head of claim 8, wherein the inner pipe is configured to route a liquid to the mixing chamber.

* * * * *